United States Patent Office 2,975,204
Patented Mar. 14, 1961

2,975,204

(CYANOPHENYL)ALKOXYSILANES

Enrico J. Pepe, Kenmore, N.Y., assignor to Union Carbide Corporation, a corporation of New York No Drawing. Filed Nov. 17, 1958, Ser. No. 774,077

19 Claims. (Cl. 260—448.8)

This invention relates, in general, to novel organosilanes and to a process for their production. More particularly, this invention relates to (cyanophenyl)alkoxysilanes as new compositions of matter and to a process for their production.

The compositions of the instant invention are the (cyanophenyl)alkoxysilanes represented by the formula:

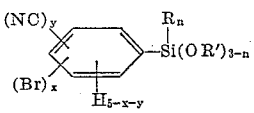

where R is a monovalent hydrocarbon radical, R' is an alkyl group, y is an integer having a value of from 1 to 3, x is an integer having a value of from 0 to 4, the sum of x+y never exceeding 5 and n is an integer having a value of from 0 to 2. Examples of the monovalent hydrocarbon radicals which R may represent are alkyl groups such as methyl, ethyl, propyl, butyl, heptadecyl and the like, cycloalkyl groups such as cyclopentyl, cyclohexyl and the like, alkenyl groups such as vinyl, allyl, butenyl and the like, cycloalkenyl groups such as cyclohexenyl and the like, and aryl groups such as phenyl, tolyl, naphthyl, and the like. Examples of the alkyl groups which R' may represent include methyl, ethyl, propyl, butyl and the like.

Thus, the (cyanophenyl)alkoxysilanes of the instant invention can have from 1 to 3 alkoxy groups attached to the silicon atom. Those having one alkoxy group are, for example, (3-cyanophenyl)dimethylethoxysilane, (3-cyanophenyl)phenylmethylmethoxysilane, (4-cyanophenyl)dibutylbutoxysilane, (2-bromo-5-cyanophenyl)dimethylpropoxysilane, (2-bromo-4-cyanophenyl)diphenylmethoxysilane, (3-bromo-5-cyanophenyl)dimethylethoxysilane, 3,5-dicyanophenyldimethylethoxysilane and the like. Those having two alkoxy groups are, for example, (3-cyanophenyl)methyldiethoxysilane, (3-cyanophenyl)phenyldibutoxysilane, (4-cyanophenyl)vinyldimethoxysilane, (2-bromo-4-cyanophenyl)methyldiethoxysilane, (2-bromo-5-cyanophenyl)vinyldipropoxysilane, (2,4-dicyanophenyl)phenyldimethoxysilane, (3-bromo-5-cyanophenyl)allyldiethoxysilane, 3,4,5-tricyanophenylmethyldiethoxysilane and the like. The cyanophenylalkoxysilanes of this invention having three alkoxy groups are, for example, (3-cyanophenyl)triethoxysilane, (4-cyanophenyl)tributoxysilane, (3-bromo-5-cyanophenyl)trimethoxysilane, (2-bromo-5-cyanophenyl)triethoxysilane, (3,5-dicyanophenyl)triethoxysilane and the like.

In accordance with my invention, the (cyanophenyl)-trialkoxysilanes are prepared by reacting an alkali metal cyanide with a (bromophenyl)alkoxysilane in the presence of a highly polar liquid organic solvent, cuprous cyanide and powdered copper. The reaction that takes place is a metathesis reaction as shown by the following equation, which depicts for the purpose of illustration, the reaction of sodium cyanide with (3-bromophenyl)triethoxysilane.

(1) 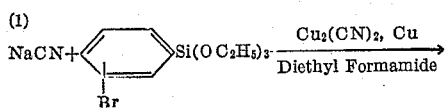

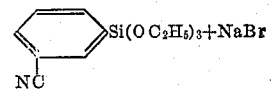

While the alkali metal cyanide and (mono-bromophenyl)alkoxysilanes can be used in chemically equivalent amounts based upon the cyanide and bromine content of the respective materials, I prefer to employ the alkali metal cyanide in amounts greater than the chemical equivalent amounts. For example, I have found it desirable to use from about 1.0 to 3.0 chemical equivalents of the alkali metal cyanide, for each chemical equivalent of the (monobromophenyl)alkoxysilane. Where the (bromophenyl)alkoxysilane has more than one bromine attached to the phenyl group, I prefer to employ 1.0 to 1.5 chemical equivalents of the alkali metal cyanide for each mole of the (bromophenyl)alkoxysilane in order to obtain compounds containing only one cyano group attached to the phenyl group. In preparing the di- and tricyanophenylalkoxysilanes, I prefer to employ from 1 to 3 chemical equivalents of the alkali metal cyanide for each chemical equivalent of bromine to be reacted. Amounts of the alkali metal cyanide in excess of the upper limits described above can also be employed; however, no commensurate advantage is gained thereby. Although any alkali metal cyanide can be used in the process of my invention, I prefer to employ sodium cyanide and potassium cyanide.

In the practice of my invention the reaction of the (bromophenyl)alkoxysilane and the alkali metal cyanide is carried out within a highly polar liquid organic compound in which the reactants are mutually soluble to an extent whereby the reacting substances are brought into reactive contact. In the absence of such a highly polar liquid organic compound as the solvent, according to my experience, the reaction does not appear to take place. Illustrative of the highly polar liquid organic compounds which are useful as solvents for the process of my invention are dialkylacylamides having from 1 to 14 carbon atoms in each of the alkyl groups, such as dimethylformamide, diethylformamide, ditetradecylformamide and the like, benzonitrile, glycol ethers such as ethylene glycol dimethyl ether, tetraethylene glycol-dimethyl ether, diethylene glycol-diethyl ether, and the like and other highly polar liquid organic compounds in which the alkali metal cyanides and starting (bromo-phenyl)alkoxysilanes have an appreciable solubility. However, I prefer to use benzonitrile or diethylformamide as the solvent.

In carrying out my process, the amount of solvent is not narrowly critical and may vary over wide limits. Preferably the amount of solvent employed should be sufficient to dissolve the (bromophenyl)alkoxysilanes, which for the most part, are miscible with the solvents in all proportions. I have found that amounts of solvents which vary from about 20 parts to about 100 parts of the combined weights of the (bromophenyl)alkoxysilane and alkali metal cyanide most suitable. Amounts of solvent below or above these limits can be used; however, no commensurate advantage is obtained thereby.

In addition to the use of a highly polar organic liquid as a solvent for the process of my invention, I have found that cuprous cyanide and powdered copper are necessary to cause the reaction to take place. In the absence of such compounds the reaction does not appear to take place in the presence or absence of the above solvents. The amounts of cuprous cyanide and powdered copper used in the preparation of the compositions of this invention are not narrowly critical. The total amount of cuprous cyanide and powdered copper used can range from 1% to 20% by weight of the starting silane. It is preferred that the total amount of cuprous cyanide and powdered copper used be approximately 10% by weight of the starting bromophenylalkoxysilane. The ratio of powdered copper to cuprous cyanide is not narrowly critical; however, I prefer to use equal amounts by weight of powdered copper and cuprous cyanide.

In carrying out the process of my invention, it is preferable that the solvent and starting materials be dry, since the presence of water will cause undesirable side reactions; such as hydrolysis of the silane and the formation of isocyanides, thus reducing the yield of the desired cyanophenylalkoxysilane.

The reaction can be conducted at temperatures of from 25° C. to 250° C. and above; however, I prefer to use temperatures from about 150° C. to 225° C. When carrying out the process of my invention, it is preferred that the reaction mixture be heated to and maintained at its boiling temperature at atmospheric pressure under total reflux, over the period of the reaction.

The pressure at which the process of my invention is carried out is not narrowly critical. Thus, the process of my invention can be carried out at atmospheric, super-atmospheric or subatmospheric pressures; however, I prefer to carry out the process of my invention at atmospheric pressure.

Although iodine is not essential to the reaction of a bromophenylalkoxysilane with an alkali metal cyanide, it can be added to react with any hydrogen bromide present, thus preventing undesirable side reactions.

The bromophenylalkoxysilane starting materials used in the preparation of the compositions of this invention are represented by the formula:

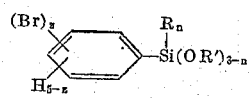

wherein R, R' and n have the above-defined meanings and z is an integer having a value of from 1 to 5. Thus, the bromophenylalkoxysilanes can be bromophenyltrialkoxysilanes, for example, 3-bromophenyltriethoxysilanes, 2,3,5 - tribromophenyltributoxysilane, (4 - bromophenyl)trimethoxysilane, 2,3,5,6 - tetrabromophenyltripropoxysilane, 2,5 - dibromophenyltrimethoxysilane, 3,5-dibromophenyltributoxysilane, pentabromophenyltriethoxysilane, and the like. The (bromophenyl)alkoxysilanes also include the (bromophenyl)hydrocarbondialkoxysilanes, for example, (3-bromophenyl)methyldiethoxysilane, (3-bromophenyl)-butyldibutoxysilane, (3-bromophenyl)vinyldimethoxysilane, (3-bromophenyl)phenyldiethoxysilane, (2,3,5,6 - tetrabromophenyl)allyldimethoxysilane, (2,5 - dibromophenyl)ethyldihexoxysilane, (2,3,5-tribromophenyl)phenyldiethoxysilane and the like. The bromophenylalkoxysilanes useful as starting materials for the preparation of the compositions of this invention also include the (bromophenyl)dihydrocarbonalkoxysilanes, for example, (3-bromophenyl)dimethylethoxysilane, (3-bromophenyl) - diphenylbutoxysilane, (3 - bromophenyl) phenylvinylethoxysilane, (2,5 - dibromophenyl)dimethylmethoxysilane, (2,5 - dibromophenyl) - diphenylbutoxysilane, (2,5 - dibromophenyl)methylvinylethoxysilane, 2,3,5 - tribromophenyldimethylethoxysilane, 2,3,6 - tribromophenyldiethylmethoxysilane, 2,3,5,6 - tetrabromophenyldimethylpropoxysilane, pentabromophenyldimethylethoxysilane and the like.

The (3-bromophenyl)alkoxysilane starting materials are prepared by the bromination of phenyltrichlorosilane with liquid bromine in the presence of powdered iron at 50° C. The use of one mole of bromine per mole of phenyltrichlorosilane yield (3-bromophenyl)trichlorosilane, while the use of two moles of bromine per mole of phenyltrichlorosilane yields (2,5-dibromophenyl)trichlorosilane. Other more highly brominated bromophenylchlorosilane are produced by employing 3, 4 and 5 moles of bromine per mole of phenyltrichlorosilane to yield bromophenylchlorosilanes containing 3, 4 and 5 bromine atoms in the phenyl group, respectively. The bromophenyl)trichlorosilanes can then be esterified with alcohols according to methods known to those in the art to yield the (bromophenyl)trialkoxysilanes. These (bromophenyl)trialkoxysilanes can then be converted into silanes containing 1 or 2 hydrolyzable alkoxy groups by reaction with various Grignard reagents according to procedures known to those in the art. Alternatively, the (bromophenyl)trichlorosilanes can be reacted with a Grignard reagent to form the mono- or dichlorosilane which can then be esterified with alcohols according to procedures known in the art to yield the bromophenyl mono- or dialkoxysilanes. The (4-bromophenyl)alkoxysilanes can be prepared by the reaction of para-dibromobenzene mono- Grignard reagent with an alkoxysilane according to procedures known to those skilled in the art. The (3,5-dibromophenyl)-chlorosilanes can be prepared by reacting a chlorosilane with (3,5-dibromophenyl)lithium according to methods known to those in the art. These chlorosilanes can be converted to alkoxysilanes by esterification with alcohols employing methods known to those in the art.

These (cyanophenyl)alkoxysilanes can also be hydrolyzed and polymerized to yield polysiloxanes that are useful as coating compositions and insulating resins having improved solvent resistance. For example, the difunctional cyanophenylpolysiloxane can be polymerized to gum stocks which can be compounded and crosslinked with benzoyl peroxide catalyst to yield elastomers which have improved solvent resistance.

The following examples serve to further illustrate my invention:

Example I

Phenyltrichlorosilane (425.0 g., 2.0 mol) and powdered iron (213 g.) were charged into a 1-liter, 3-necked flask fitted with a mechanical stirrer, reflux condenser, dropping funnel and thermometer. Liquid bromine (244.5 g., 1.5 mol) was added dropwise over a 1½ hour period to the rapidly stirred chlorosilane while maintaining the temperature at about 45° C. The mixture was then heated for 2 hours at 80° C. with nitrogen sparging. 3-bromophenyltrichlorosilane (420 g.) (B.P. 80–81° C. at 0.4 mm. Hg) was recovered from the reaction mixture by distillation at reduced pressure.

3-bromophenyltrichlorosilane (210.7 g., 0.72 mol) was charged into a 500 milliliter, 3-necked flask fitted with a mechanical stirrer, reflux condenser, dropping funnel, thermometer and gas inlet tube. The chlorosilane was stirred under a slight nitrogen sparge while absolute ethanol (110 g., 2.4 mol) was added over a 20 minute period. The reaction mixture was sparged with nitrogen for one hour at which time gaseous ammonia was bubbled into the reaction mixture for 10 minutes. The excess ethanol was removed by vacuum evaporation and the crude product dissolved in diethyl ether to facilitate the removal of the ammonium chloride by filtration. The ether was removed by vacuum evaporation and the the residue distilled under reduced pressure to yield 3-bromophenyltriethoxysilane (boiling point 120° C. at 1.9 mm. Hg, $N_D^{25}$=1.4883 and a density at 25° C. of 1.239 g./cc.). The structure was verified by infrared spectral analysis and elemental analysis.

Example II

Anhydrous sodium cyanide (115.6 g., 2.36 mol), 3-bromophenyltriethoxysilane 3-$BrC_6H_4Si(OEt)_3$ (775 g. 2.36 mol) copper cyanide $Cu_2(CN)_2$ (75 g., 0.42 mol) and powdered copper (75 g., 1.17 mol) were charged into a 2-liter, 3-necked flask fitted with a reflux condenser, stirrer and thermometer. Iodine (2.0 g.) and freshly distilled diethyl formamide (250 ml.) were then added. The mixture was heated to 185° C. with stirring for approximately 70 hr. The reaction mixture was cooled, filtered and then stripped of solvent under reduced pressure. Distillation at reduced pressure yielded 3-cyanophenyltriethoxysilane which has the following physical properties (B.P. 140–141° C. at 8 mm. Hg, $d^{25}$=1.06 g./cc.). The structure was verified by infrared spectral analysis and elemental analysis.

*Example III*

(A) Phenyltrichlorosilane (318 grams, 1.5 mol) and powdered iron (1.6 grams) were charged into a 1-liter, 3-necked flask fitted with a stirrer, reflux condenser, thermometer and dropping funnel. Bromine (526 g., 3.3 mol) was charged into the dropping funnel, and added dripwise over a 4½ hour period to the stirred mixture. The mixture was stirred over-night with a nitrogen purge. The reaction mixture was distilled through a Vigreaux column to yield a product containing polybromobenzene (20% by weight) and 2,5-dibromophenyltrichlorosilane (80% by weight) B.P. 88° C./0.3 mm. to 135° C./1.0 mm. Hg. The silane was further characterized by infrared spectral analysis.

(B) The 2,5-dibromophenyltrichlorosilane (496 g.) prepared above was charged into a 2-liter, 3-necked flask fitted with a reflux condenser, stirrer and dropping funnel. Absolute alcohol (162 grams) was added dropwise over a ½ hour period with stirring and a nitrogen sparge. After the addition was complete, the mixture was heated to 80° C. for 1 hour. On cooling, a small quantity of needle-like crystals precipitated and was recovered by filtration. This crystalline material was identified as 1,2,4,5-tetrabromobenzene by analysis. The filtrate was distilled under reduced pressure to yield 2,5-dibromophenyltriethoxysilane (B.P. 110–111° C. at 0.1 mm. Hg, $n_D^{25}$=1.5258. The structure was confirmed by infrared spectral analysis and elemental analysis.

*Example IV*

Anhydrous sodium cyanide (30 g., 0.6 mol), 2,5-dibromophenyltriethoxysilane (195 g., 0.488 mol) cuprous cyanide (Cu$_2$(CN)$_2$, 15 g., 0.08 mol), powdered copper (15 g.) and iodine (0.6 g.) were charged into a 1-liter, round-bottomed flask. Diethylformamide (200 ml.) was added, a reflux condenser attached and the mixture heated to reflux (185° C.) for 12 hours. After cooling, the mixture was filtered and the solvent removed by vacuum evaporation. The residue was distilled under reduced pressure through a Vigreaux column to yield 2-bromo-5-cyanophenyltriethoxysilane (85 g., 0.247 mol) which has the following physical properties: B.P. 119–230° C./at 0.35 mm. Hg, $n_D^{25}$ 1.5046.

The structure was verified by infrared and elemental analysis.

*Example V*

Into a 3-liter, 3-necked flask fitted with mechanical stirrer, condenser, thermometer and dropping funnel, were placed 3-BrC$_6$H$_4$Si(OEt)$_3$ (640 g., 2.0 mols) dissolved in anhydrous diethyl ether (2 lb.). To this rapidly stirred mixture was added over a 2-hour period, methyl magnesium iodide (666 ml. of an approximately 3 molar solution in n-butyl ether). Ether reflux was maintained throughout the addition and continued for 16 hours after the addition. The ether was then boiled away to raise the pot temperature to 65° C. On cooling the reaction mixture was filtered to remove salts. The residue ether was removed by vacuum stripping. The product 3-BrC$_6$H$_4$SiMe(OEt)$_2$ was isolated by distillation (B.P. 154–155° C./26 mm. $n_D^{25}$ 1.5003).

*Example VI*

Into a 2-liter, 3-necked flask fitted with condenser, stirrer and thermometer were placed 3-bromophenylmethyldiethoxysilane (694 g., 2.4 mols), anhydrous NaCN, (117 g., 2.4 mols), 77 g. (0.4 mol) cuprous cyanide, 77 g. (1.1 mols) of powdered copper metal, 1 g. of iodine and 500 ml. of anhydrous benzonitrile. The mixture was heated to reflux (200±5° C.) for 85 hours, then cooled and filtered and then stripped of solvent at reduced pressure. Distillation at reduced pressure through a 50 cm. Vigreaux column gave 512 g. of product (90 mol-percent yield), B.P. 96–100° C./0.2 mm.

Fractional distillation gave the pure compound (3-cyanophenyl)methyldiethoxysilane (B.P. 159°C./18.0 mm. $n_D^{25}$ 1.4855). The structure was verified by infrared spectral and elemental analysis.

*Example VII*

Into a 5-liter, 3-necked flask fitted with mechanical stirrer, condenser, thermometer and dropping funnel, were placed (3-bromophenyl)trichlorosilane (1360 g., 4.67 mols) dissolved in 1400 ml. of anhydrous diethyl ether. This mixture was heated to reflux with rapid stirring. Addition of methyl magnesium iodide (2.8 N in n-butyl ether, 1670 ml.) was made in 2 hrs. The temperature of ether reflux rose to 68° C. Additional ether (300 ml.) was added and reflux with stirring continued for 16 hrs. The reaction mixture was filtered free of MgCl$_2$ and the filtrate and combined ether wash of the MgCl$_2$ was stripped of ether and the residue distilled at reduced pressure to isolate 3-bromophenylmethyldichlorosilane.

The chlorosilane was ethoxylated in the manner of Example I to yield 3-bromophenylmethyldiethoxysilane.

*Example VIII*

In a 2-liter, 3-necked, round-bottom flask fitted with stirrer, reflux condenser tube, were placed para-bromophenyltriethoxysilane (755 g., 2.36 mols), sodium cyanide (115.6 g., 2.36 mols), cuprous cyanide (75 g., 0.42 mol), copper metal (75 g., 1.17 mol) and benzonitrile (300 ml.), The mixture was stirred and heated to reflux. After 16 hours of reflux the reaction mixture was filtered free of solids and the solid removed by vacuum evaporation. The product was fractionated under reduced pressure. Para-cyanophenyltriethoxy silane (B.P. 118/1.5 mm.; $n_D^{25}$=1.4752) was obtained.

*Example IX*

Anhydrous sodium cyanide (117 g., 2.45 mols), copper cyanide Cu$_2$(CN)$_2$ (77 g., 0.4 mol) and powdered copper (77 g.), iodine (1 g.) and 500 ml. of benzonitrile were charged into a 2-liter, 3-necked flask fitted with a reflux condenser, stirrer and thermometer and heated to 200° C. to remove any water. The mixture was cooled to room temperature and 3-bromophenyltriethoxysilane (705 g., 2.2 mols) was then added. The mixture was then heated to 180–185° C. with stirring for approximately 70 hours. The reaction mixture was cooled, filtered and then stripped of solvent under reduced pressure. Distillation at reduced pressure gave 3-cyanophenyltriethoxysilane (B.P. 91° C. at 0.3 mm. Hg., $n_D^{25}$ 1.4741) in 82% yield.

By way of further illustration, the following cyanophenylalkoxysilanes can be prepared by the reaction of sodium cyanide with a bromophenylalkoxysilane according to the procedure of Example VIII:

A dicyanophenyltriethoxysilane from a dibromophenyltriethoxysilane, employing two or more moles of sodium cyanide per mole of the dibromophenyltriethoxysilane; a tricyanophenyltriethoxysilane from a tribromophenyltriethoxysilane, employing three or more moles of sodium cyanide per mole of the tribromophenyltriethoxysilane; a tribromodicyanophenyltriethoxysilane from a pentabromophenyltriethoxysilane, employing three to four moles of sodium cyanide per mole of the pentabromophenyltriethoxysilane; a tribromocyanophenyltriethoxysilane from a tetrabromophenyltriethoxysilane employing three to four moles of sodium cyanide per mole of the tetrabromophenyltriethoxysilane.

What is claimed is:

1. Cyanophenylalkoxysilanes of the formula:

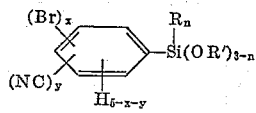

wherein R is a monovalent hydrocarbon radical, R' is an alkyl group, n is an integer of from 0 to 2, x is an integer having a value of from 0 to 4, y is an integer having a value of from 1 to 3 and the sum of x+y not exceeding 5.

2. Cyanophenylalkoxysilanes of the formula:

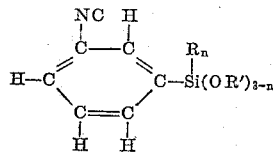

wherein R is a monovalent hydrocarbon radical, R' is an alkyl group and n is an integer of from 0 to 2.

3. Cyanophenylalkoxysilanes of the formula:

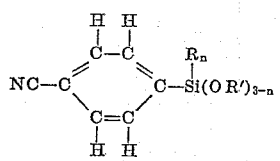

wherein R is a monovalent hydrocarbon radical, R' is an alkyl group and n is an integer of from 0 to 2.

4. Cyanophenylalkoxysilanes of the formula:

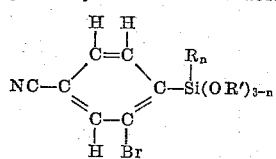

wherein R is a monovalent hydrocarbon radical, R' is an alkyl group, and n is an integer of from 0 to 2.

5. Cyanophenylalkoxysilanes of the formula:

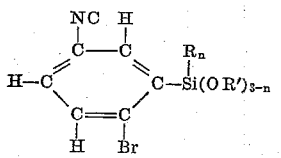

wherein R is a monovalent hydrocarbon radical, R' is an alkyl group and n is an integer of from 0 to 2.

6. Cyanophenylalkoxysilanes of the formula:

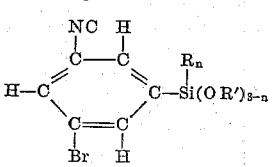

wherein R is a monovalent hydrocarbon radical, R' is an alkyl group and n is an integer of from 0 to 2.

7. (3-cyanophenyl)triethoxysilane.
8. (3-cyanophenyl)methyldiethoxysilane.
9. (2-bromo-5-cyanophenyl)triethoxysilane.
10. 4-cyanophenyltriethoxysilane.

11. A process for the production of (cyanophenyl)-alkoxysilanes of the formula:

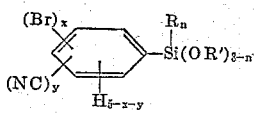

wherein R is a monovalent hydrocarbon radical, R' is an alkyl group, n is an integer of from 0 to 2, x is an integer having a value of from 0 to 4, y is an integer having a value of from 1 to 3 and the sum of x+y not exceeding 5, which comprises forming a mixture of an alkali metal cyanide and a (bromophenyl)alkoxysilane of the formula:

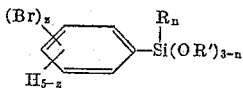

wherein R, R' and n have the above-defined meanings and z is an integer having a value of from 1 to 5, in the presence of a highly polar liquid organic solvent, powdered copper and cuprous cyanide and heating the mixture to a temperature sufficiently elevated to cause said alkali metal cyanide and said (bromophenyl)alkoxysilane to react to produce said (cyanophenyl)alkoxysilanes.

12. A process for the production of (cyanophenyl)-alkoxysilanes of the formula:

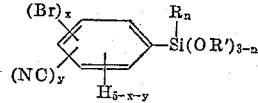

wherein R is a monovalent hydrocarbon radical, R' is an alkyl group, n is an integer of from 0 to 2, x is an integer having a value of from 0 to 4, y is an integer having a value of from 1 to 3 and the sum of x+y not exceeding 5, which comprises forming a mixture of an alkali metal cyanide and a (bromophenyl)alkoxysilane of the formula:

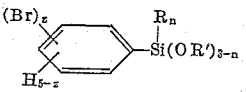

wherein R, R' and n have the above-defined meanings and z is an integer having a value of from 1 to 5, in the presence of a dialkylacylamide, powdered copper and cuprous cyanide and heating the mixture to a temperature sufficiently elevated to cause said alkali metal cyanide and said (bromophenyl)alkoxysilane to react to produce said (cyanophenyl)alkoxysilanes.

13. A process for the production of (cyanophenyl)-alkoxysilanes of the formula:

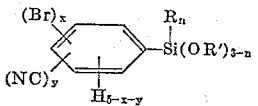

wherein R is a monovalent hydrocarbon radical, R' is an alkyl group, n is an integer of from 0 to 2, x is an integer having a value of from 0 to 4, y is an integer having a value of from 1 to 3 and the sum of x+y not exceeding 5, which comprises forming a mixture of an alkali metal cyanide and a (bromophenyl)alkoxysilane of the formula:

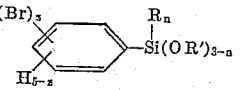

wherein R, R' and n have the above-defined meanings and z is an integer having a value of from 1 to 5, in the presence of N,N-diethylformamide, powdered copper and cuprous cyanide and heating the mixture to a temperature sufficiently elevated to cause said alkali metal cyanide and said (bromophenyl)alkoxysilane to react to produce said (cyanophenyl)alkoxysilanes.

14. A process for the production of (cyanophenyl)-alkoxysilanes of the formula:

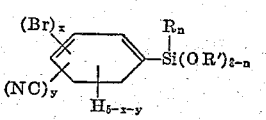

wherein R is a monovalent hydrocarbon radical, R' is an alkyl group, n is an integer of from 0 to 2, x is an integer having a value of from 0 to 4, y is an integer having a value of from 1 to 3 and the sum of x+y not exceeding 5, which comprises forming a mixture of an alkali metal cyanide and a (bromophenyl)alkoxysilane of the formula:

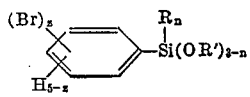

wherein R, R' and n have the above-defined meanings and z is an integer having a value of from 1 to 5, in the presence of benzonitrile, powdered copper and cuprous cyanide and heating the mixture to a temperature sufficiently elevated to cause said alkali metal cyanide and said (bromophenyl)alkoxysilanes to react to produce said (cyanophenyl)alkoxysilanes.

15. A process for the production of (cyanophenyl)alkoxysilanes of the formula:

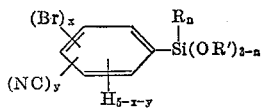

wherein R is a monovalent hydrocarbon radical, R' is an alkyl group, n is an integer of from 0 to 2, x is an integer having a value of from 0 to 4, y is an integer having a value of from 1 to 3 and the sum of $x+y$ not exceeding 5, which comprises forming a mixture of an alkali metal cyanide and a (bromophenyl)alkoxysilane of the formula:

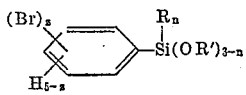

wherein R, R' and n have the above-defined meanings and z is an integer having a value of from 1 to 5, in the presence of a highly polar liquid organic solvent, powdered copper and cuprous cyanide and heating the mixture to a temperature of from about 25° C. to about 250° C. to cause said alkali metal cyanide and said (bromophenyl)alkoxysilane to react to produce said (cyanophenyl)alkoxysilanes.

16. A process for the production of (cyanophenyl)alkoxysilanes of the formula:

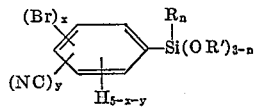

wherein R is a monovalent hydrocarbon radical, R' is an alkyl group, n is an integer of from 0 to 2, x is an integer having a value of from 0 to 4, y is an integer having a value of from 1 to 3 and the sum of $x+y$ not exceeding 5 which comprises forming a mixture of an alkali metal cyanide and a (bromophenyl)alkoxysilane of the formula:

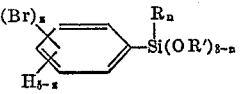

wherein R, R' and n have the above-defined meanings and z is an integer having a value of from 1 to 5, in the presence of a highly polar liquid organic solvent, powdered copper and cuprous cyanide and heating said mixture to its boiling temperature to cause said alkali metal cyanide and said (bromophenyl)alkoxysilanes to react to produce said (cyanophenyl)alkoxysilanes.

17. A process for producing (3-cyanophenyl)triethoxysilane which comprises forming a mixture of sodium cyanide, (3-bromophenyl)triethoxysilane, powdered copper, and cuprous cyanide in diethylformamide and heating said mixture to its boiling temperature at atmospheric pressure to cause said sodium cyanide and said (bromophenyl)triethoxysilane to react to produce (3-cyanophenyl)triethoxysilane.

18. A process for producing (2-bromo-5-cyanophenyl)triethoxysilane which comprises forming a mixture of sodium cyanide, (2,5-dibromophenyl)triethoxysilane, powdered copper, and cuprous cyanide in diethylformamide and heating said mixture to its boiling temperature at atmospheric pressure to cause said sodium cyanide and said (2,5-dibromophenyl)triethoxysilane to react to produce said (2-bromo-5-cyanophenyl)triethoxysilane.

19. A process for producing (3-cyanophenyl)triethoxysilane which comprises forming a mixture of sodium cyanide, (3-bromophenyl)triethoxysilane, powdered copper and cuprous cyanide in benzonitrile and heating said mixture to its boiling temperature at atmospheric pressure to cause said sodium cyanide and said (bromophenyl)triethoxysilane to react to produce (cyanophenyl)triethoxysilane.

References Cited in the file of this patent

UNITED STATES PATENTS 2,783,262   Merker _____ Feb. 26, 1957

OTHER REFERENCES

Lewis et al.: "Jour. Amer. Chem. Soc.," vol. 74 (1952), pages 2931–3.